(12) United States Patent
Brooks et al.

(10) Patent No.: US 7,685,106 B2
(45) Date of Patent: *Mar. 23, 2010

(54) SHARING OF FULL TEXT INDEX ENTRIES ACROSS APPLICATION BOUNDARIES

(75) Inventors: David A. Brooks, Providence, RI (US); Niklas Heidloff, Salzkotten (DE); Hong Dai, Westford, MA (US); Craig R. Wolpert, Holliston, MA (US); Igor L. Belakovskiy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 11/118,933

(22) Filed: Apr. 29, 2005

(65) Prior Publication Data

US 2006/0248039 A1 Nov. 2, 2006

(51) Int. Cl.
*G06F 7/00* (2006.01)
*G06F 17/30* (2006.01)
*G06F 15/16* (2006.01)

(52) U.S. Cl. ........................ 707/3; 707/4; 707/5; 707/6
(58) Field of Classification Search ................ 707/1–10; 709/203–219; 705/1
See application file for complete search history.

(56) References Cited

U.S. PATENT DOCUMENTS 5,706,365 A 1/1998 Rangarajan et al.

(Continued)

OTHER PUBLICATIONS

Hohensee et al, Interchangable & Durable Document Index Structure for Presentation Document, IBM Dossier, TUC919930038.

(Continued)

*Primary Examiner*—Cam Y Truong
*Assistant Examiner*—Cecile Vo
(74) *Attorney, Agent, or Firm*—David A. Dagg (57) ABSTRACT

A method and system for sharing full text index entries across application boundaries in which documents are obtained by a shared, platform level indexing service, and a determination is made as to whether the received documents are duplicates with regard to previously indexed documents. If a document is determined to be a duplicate, the index representation of the previously indexed copy of the document is modified to indicate that the document is also associated with another application or context. If a document is not a duplicate of a previously indexed document, the document is indexed to support future searches and/or other processing. The index representation of a document includes application category identifiers associating one or more applications or contexts with the document. When a document is indexed, one or more category identifiers are generated and stored in association with that document. The category identifiers for an indexed document may, for example, represent an application that received, stored, or otherwise processed that document. The application category identifiers enable category specific searching by applications sharing a common search index. A software category filter may be provided to process search results from the shared search index, so that only documents associated with certain categories are returned. Accordingly, one or more search categories may be determined for a given search query, based on an application generating the search query, or some other context information, and then used to filter the search results provided from the shared search index.

9 Claims, 5 Drawing Sheets

U.S. PATENT DOCUMENTS

| | | | |
|---|---|---|---|
| 6,360,215 B1 * | 3/2002 | Judd et al. | 707/3 |
| 6,374,241 B1 | 4/2002 | Lamburt et al. | |
| 6,675,205 B2 * | 1/2004 | Meadway et al. | 709/219 |
| 7,213,013 B1 * | 5/2007 | Subramaniam et al. | 707/3 |
| 7,228,299 B1 * | 6/2007 | Harmer et al. | 707/3 |
| 7,266,553 B1 * | 9/2007 | Anderson et al. | 707/5 |
| 2002/0156917 A1 * | 10/2002 | Nye | 709/238 |
| 2003/0110162 A1 | 6/2003 | Newman | |
| 2004/0024778 A1 | 2/2004 | Cheo | |
| 2004/0078750 A1 | 4/2004 | Frank | |
| 2004/0133609 A1 | 7/2004 | Moore et al. | |
| 2004/0143569 A1 | 7/2004 | Gross et al. | |
| 2004/0177319 A1 | 9/2004 | Horn | |
| 2007/0027854 A1 * | 2/2007 | Rao et al. | 707/3 |

OTHER PUBLICATIONS

Nelson, System and Method for Automatically Linking Items with Multiple Attributes to Multiple Levels of Folders within a Content Management System, IBM Dossier SVL920020098.

* cited by examiner

DOCUMENT SEARCH

Application Categories

☐ All Applications
☐ Human Resources Application
☐ Email
☐ MyDocs
· · ·

Search for: [                    ]

[SEARCH] [CANCEL]

70 DOCUMENT SEARCH INTERFACE

SHARING OF FULL TEXT INDEX ENTRIES ACROSS APPLICATION BOUNDARIES

FIELD OF THE INVENTION

The present invention relates generally to systems for storing and accessing electronic documents that are shared or duplicated by multiple computer application programs, and more particularly to a system and method for sharing full text index entries across application boundaries.

BACKGROUND OF THE INVENTION

Many types of computer software application systems have been developed that operate using sets of related documents or files. Such application related documents may be stored, accessed, conveyed, and/or otherwise processed by an associated application, using either an application specific document database, or using a database shared with other applications. As it is generally known, such document databases may contain documents including any specific form of data including text, images, sound, video, and/or any other specific data type.

For any set of documents, in order to improve performance of operations such as searches, sorts, and others, it is often useful to create and maintain a "search index" data structure. For example, a search index enables efficiently matching tokens within a search query to documents containing those tokens. For the contents of a document to be represented in a search index, the document must go through an "indexing" step, resulting in information describing the document contents being added to the index.

Unfortunately, indexing large numbers of documents is expensive both in terms of CPU utilization and in the size of the search index. For each document indexed, multiple processing steps may be required, such as conversion from a document markup format to a plain text format, language detection, tokenization, and insertion into the index. These actions may consume significant processor and storage resources.

In multi-application execution environments, such as those referred to as "on-demand" application environments, individual applications may operate independently, while sharing underlying platform resources with other applications. Moreover, each application may communicate with one or more other applications. For example, inter-application communication may be provided between an electronic mail ("email") application and a content management ("CM") application, through which an email attachment document may be moved from the email application to a document repository under the control of the CM application. During such operations, in which a document is moved from one application to another, existing application platforms have typically re-indexed the document being moved. The document may accordingly be indexed once for use by the email application, and then again for the CM application. This is disadvantageous, resulting in identical content being re-indexed for use in two different application contexts. It would be desirable to eliminate such unnecessary processing and resource consumption to improve the performance of a platform level indexing service.

In some existing systems, multiple applications may each have their own data store and associated search index. Content sharing between such independent databases may not be possible. In other systems, multiple applications or content sources may employ a single search index. However, each application is still required to maintain a distinct set of documents within the shared search index, irrespective of whether identical documents are stored multiple times by multiple applications. In either case, significant improvements in performance would result from reducing or eliminating the indexing of documents multiple times for use by different applications or application instances.

SUMMARY OF THE INVENTION

To address the above described and other shortcomings of previous systems, a method and system for sharing full text index entries across application boundaries is disclosed. In the disclosed system, documents are obtained by a shared, platform level indexing service, and a determination is made as to whether the received documents are duplicates with regard to previously indexed documents. If a document is determined to be a duplicate, the index representation of the previously indexed copy of the document is modified to indicate that the document is also associated with another application or context. If a document is not a duplicate of a previously indexed document, the document is indexed to support future searches and/or other processing. Determination of whether a document is a duplicate may be accomplished based on document identifiers generated from document metadata, and/or based on all or part of the document contents itself. Accordingly, a document identifier may be generated and stored for comparison with identifiers of subsequent documents that are candidates for indexing.

The index representation of a document includes application category identifiers associating one or more applications or contexts with the document. When a document is indexed, one or more category identifiers are generated and stored in association with that document. The category identifiers for an indexed document may, for example, represent an application that received, stored, or otherwise processed that document. The application category identifiers enable category specific searching by applications sharing a common search index. A software category filter may be provided to process search results from the shared search index, so that only documents associated with certain categories are returned. Accordingly, one or more search categories may be determined for a given search query, based on an application generating the search query, or some other context information, and then used to filter the search results provided from the shared search index.

The disclosed system provides an application framework for efficiently moving a previously indexed document between application containers, in which underlying search index data is transformed without requiring document re-indexing. Since moving a document between applications, or displaying its content in multiple views, typically does not change the content of the document, the disclosed system improves indexing platform performance.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
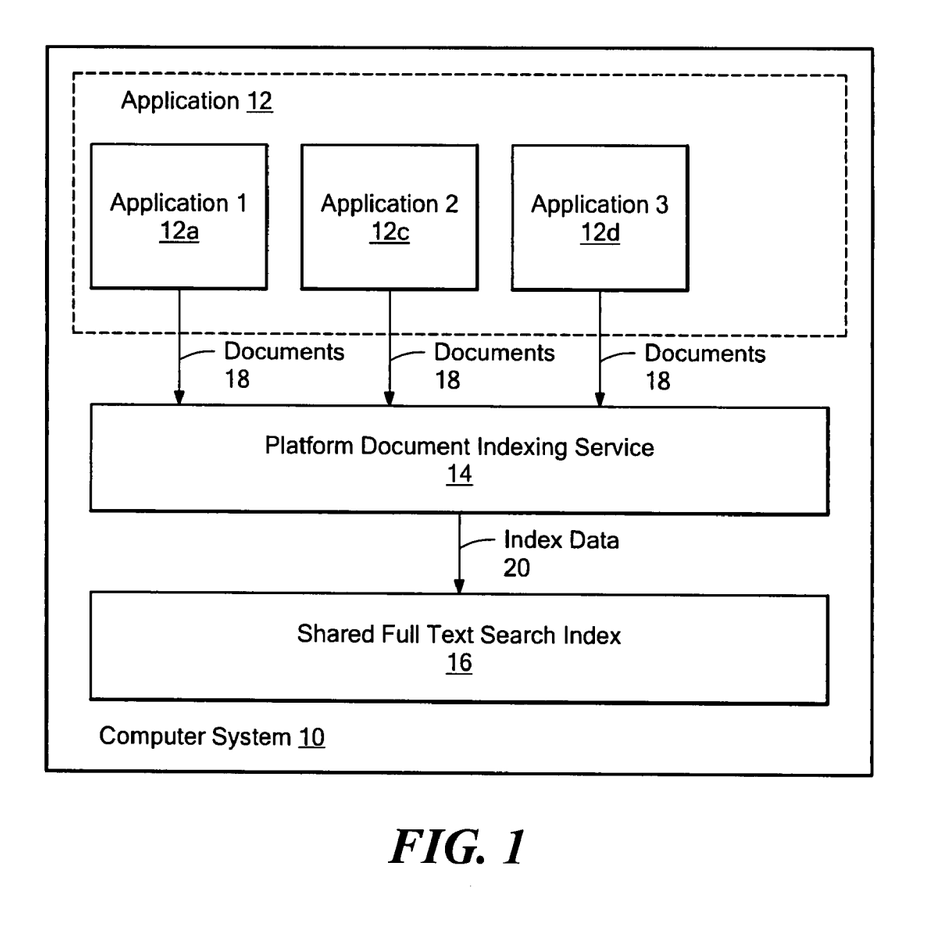
FIG. 1 is a first block diagram illustrating the structure and operation of software components in an illustrative embodiment of the disclosed system.

As shown in FIG. 1, an illustrative embodiment of the disclosed system operates using a number of software components executing on at least one computer system, shown for purposes of illustration as the computer system 10. The computer system 10 may, for example, include at least one processor, program storage, such as memory, for storing program code executable on the processor, and one or more input/output devices and/or interfaces, such as data communication and/or peripheral devices and/or interfaces. The computer system 10 may further be embodied as one or more physically distributed computer systems, such as one or more client and server computer systems, that are communicably connected by a data communication system, such as a Local Area Network (LAN), the Internet, or the like. The computer system 10 may further include appropriate operating system software.

In the embodiment of FIG. 1, a number of computer software applications 12 are shown, for purposes of illustration, including Application 1 12a, Application 2 12c, and Application 3 12d. The disclosed system may operate to support multiple applications of any specific type, and of any specific number. The applications 12 are each associated with some number of electronic documents, which they may process in a variety of specific ways. The applications 12 may receive, create, or otherwise process the documents they are associated with. Each of the applications 12 may include a dedicated database for storing the documents it processes, or may store its associated documents in a database shared with one or more other of the applications 12.

For example, one of the applications 12 may consist of an email application, including a number of message mailboxes, each of which containing some number of documents, such as email messages, and any attachments. Another of the applications 12 may consist of a content management application, which allows a user to persistently and securely store documents that may be shared with other users, for example in an encrypted database on a server system remote from the user's client computer system. Those skilled in the art will recognize that the present system is not limited to operation with these types of applications, but is applicable to any specific type of application having an associated set of documents.

The platform document indexing service 14 is a software process that obtains documents 18 from the applications 12 in order to maintain the shared full text search index 16 by providing index data 20 to be stored in the shared full text search index 16. The indexing service 14 may obtain the documents 18 in various specific ways, as appropriate for a given embodiment. For example, indexing service may periodically check for new or modified documents in one or more databases associated with the applications 12. Alternatively, or in addition, the indexing service may detect when a document is moved from one to another of the applications 12. As a result, the indexing service operates to maintain indexing information in the search index 16 for documents accessible to the applications 12.

When it indexes a document, the indexing service 14 stores category information in the search index 16 indicating which applications within the applications 12 that document is to be associated with. The category information stored by the indexing service 14 enables the search index to be used independently by different applications within the applications 12.

For example, if the indexing service 16 obtains a document from an email application in the applications 12, it stores category information in the shared index 16 indicating that the document is stored in association with the email application. If the same document is subsequently copied from the email application to a content management application, it may again be obtained for indexing, this time from the content management application. The indexing service 14 would determine that the document has previously been indexed, and need not be indexed again. In addition, the indexing service 14 would store category information in the shared index 16 indicating that the document is also stored by the content management application.

Figure 2:
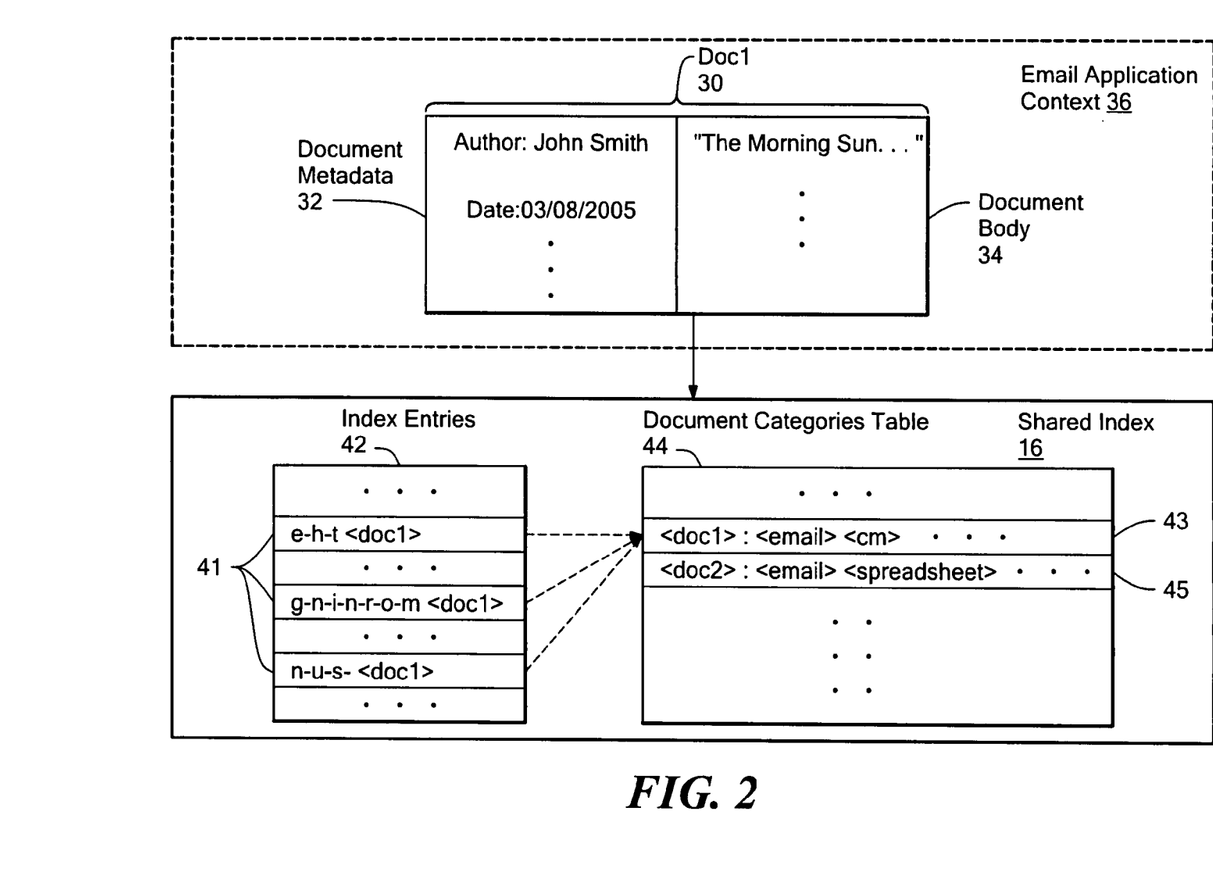
FIG. 2 is a second block diagram illustrating the structure and operation of software components in an illustrative embodiment of the disclosed system.

FIG. 2 shows an example of a document, shown as document Doc1 30, associated with an example of an application, shown as email application context 36. The document 30 may consist of an email messages stored in a user's mailbox, including a document body 34 and document metadata 32. As shown in FIG. 2, the document body 34 includes the text "The Morning Sun". The document metadata 32 includes indication that John Smith is the document author, and that a date associated with the document, such as the date an email message was received, is Mar. 08, 2005.

After processing by an embodiment of the disclosed indexing service, index data representing the document 30, is stored in the shared index 16. For purposes of illustration and explanation, the shared index 16 is shown including index entries 42. The index entries 42 in FIG. 2 are an example of a search index data structure that enables efficient text searching across an associated document set. The index entries 42 may make up or form part of what is sometimes referred to by computer scientists as a "trie", from the word "retrieval". While the disclosed system may be embodied using a "trie" data structure, it is not limited to such an embodiment, and any other specific type or structure may be used for the shared index 16. The index entries 42 are used to store an index "profile" of the document 30.

In the example of FIG. 2, the index entries 42 associate the words "the", "morning", and "sun" with an entry 43 for the document 30, in a document categories table 44. As in one conventional practice, matching of text strings in the index entries 42 is done in reverse character order; "the" is therefore matched by the entry containing "e-h-t", "morning" by "g-n-i-n-r-o-m", etc. The entries 41 in index entries 42 representing the contents of the document 30 may further include indications, pointers or links describing where the document 30 is stored, so that such information can be provided in search results for search queries matching the contents document 30. Other information, reflecting frequency of occurrence or location within the document 30, may further be included within the entries 41.

In the example of FIG. 2, the entries 41 in the index entries 42 are associated with the document 30 by the identifier "<doc1>", which also identifies the relevant entry 43 in the document categories table 44. As further shown in the example of FIG. 2, the document 30 is associated by the entry 43 with application categories including email ("<email>"), and content management ("<cm>"). Another entry 45 associates a document having an identifier "<doc2>" with email and spreadsheet ("<spreadsheet>") applications. Any specific technique or structure may be used to associate documents with categories within the shared index 16.

Advantageously, after a document has been indexed by the disclosed system, it need not be re-indexed. Accordingly, the index entries 42 need not be modified when a copy or duplicate of a document is passed to the indexing system, or when a document is moved from one application database to another. In order to determine whether a document passed to the indexing has previously been "profiled", such that information representing the document has already been stored in the index entries 42, information stored in the document categories table 44 may be checked. For example, if there is no entry in the document categories table 44 for an obtained document, that may provide indication that the document has not previously been indexed. Alternatively, hash codes or the like, generated based on portions of the content of or metadata associated with previously indexed documents, may be stored in the document categories table 44 or other data structure associated with the shared index 16. These codes may then be compared with those generated based on newly obtained documents to determine whether the newly obtained documents have previously been indexed.

Figure 3:
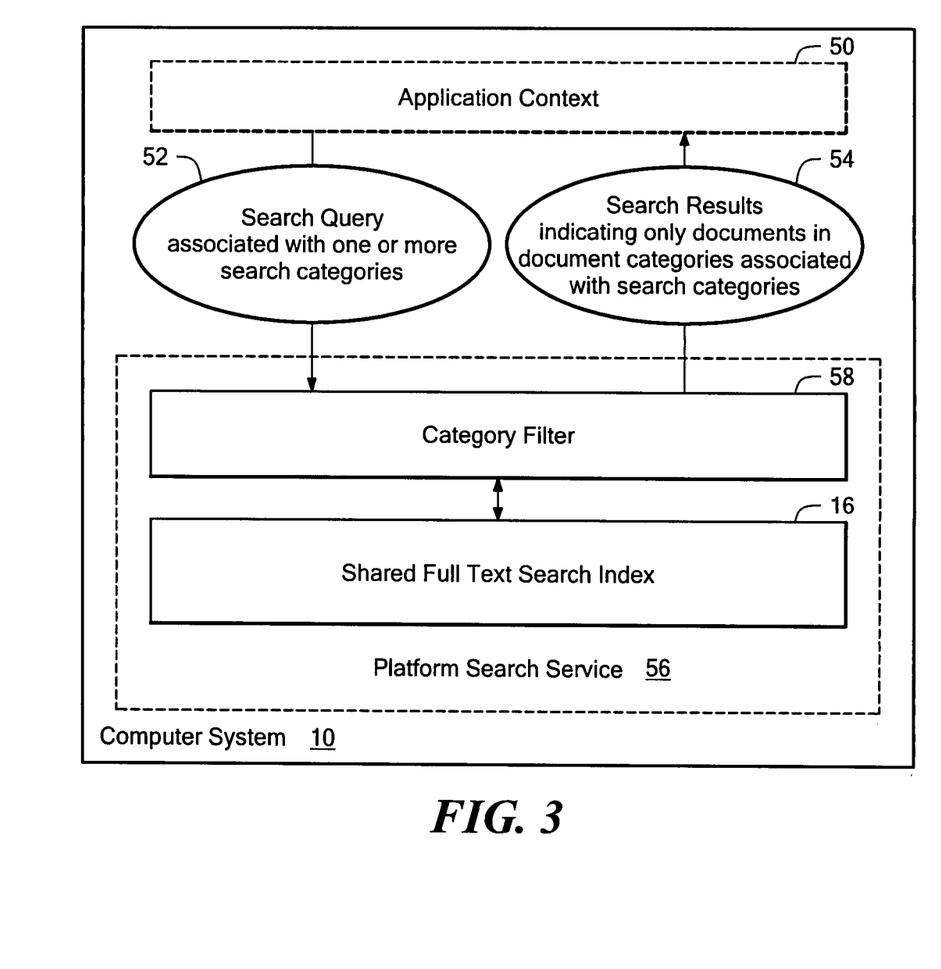
FIG. 3 is a third block diagram illustrating the structure and operation of software components in an illustrative embodiment of the disclosed system.

FIG. 3 shows the structure and operation of software components for performing category based searches in an illustrative embodiment of the disclosed system. As shown in FIG. 3, an application, shown by application context 50, issues a search query 52, containing a text search string for matching, and associated with one or more search categories. For example, a category associated with the search query 52 may reflect the specific application generating the search query 52, determined in response to the application context 50. Alternatively, the search query 52 may itself expressly include or indicate one or more search categories, which may generated by the application issuing the search query 52, or entered by a user through a graphical user interface of such an application.

The search query 58, including its search string and associated search category information, is processed through the category filter 58, using information stored in the shared full text search index 16. As shown in FIG. 3, the category filter 58 and shared full text search index 16 may, for example, be contained in a platform search service 56. The category filter 58 operates to provide search results 54, indicating only documents in document categories associated with the search query 52. Accordingly, if a specific type of application generates the search query 52, such as an email or other specific application, then the category filter 58 operates to provide search results 54 indicating only those documents matching the search string and having category information indicating an association with the application generating the search query. Search queries may indicate multiple search categories, in which case the category filter 58 provides search results across all such categories. This enables searches across documents stored by multiple applications.

Figure 4:
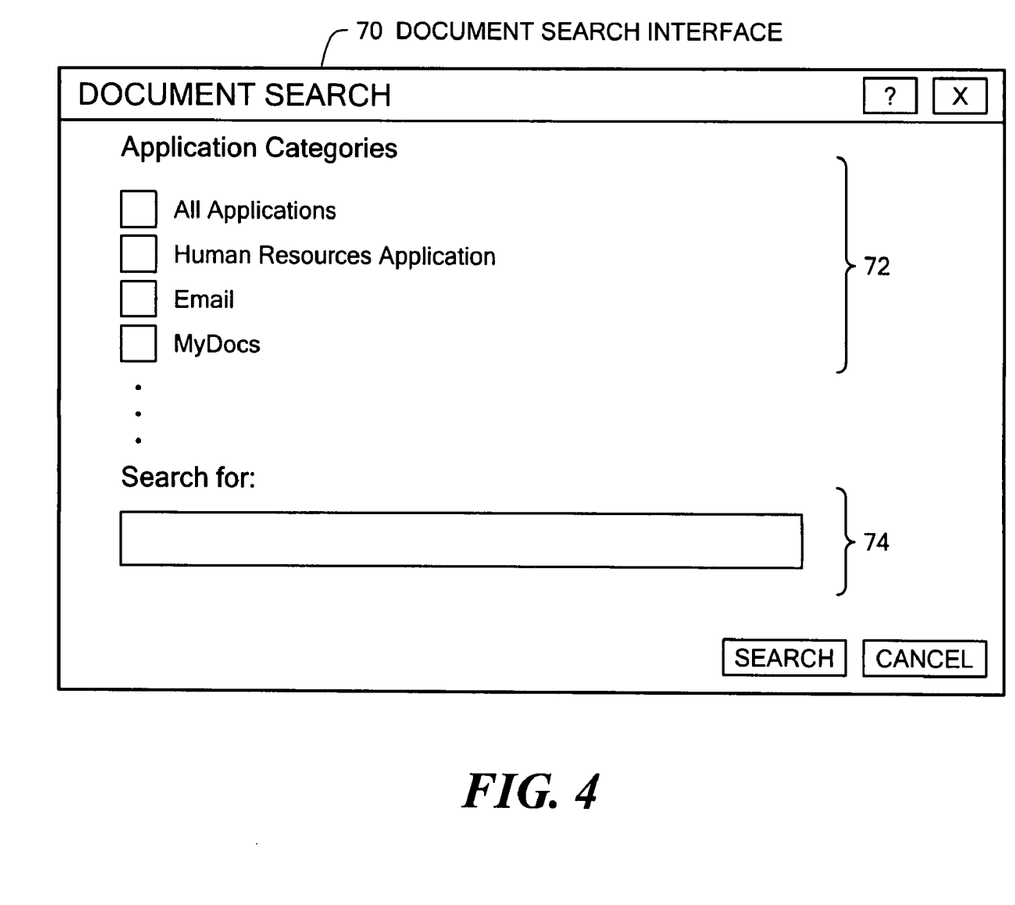
FIG. 4 is a screen shot showing a simplified example of a graphical user interface generated by an embodiment of the disclosed system.

FIG. 4 is a screen shot showing a simplified example of a graphical user interface generated by an embodiment of the disclosed system. As shown in FIG. 4, the document search interface 70 includes a category indication interface 72, shown for purposes of illustration as including check boxes for a user to indicate one or more categories, or meta-categories, over which a search is to be performed. For example, the user may indicate that the search is to be performed over "All Applications", which would result in a search being performed across documents stored by or in association with all applications on the system. An indication by the user of "Human Resources Applications" results in another example of a multi-category search, this time across a predetermined set of application categories associated with a human resources business function. The user may alternatively indicate individual application categories, shown for purposes of illustration as including the "Email" application, and a "MyDocs" application, which is an example of a content management application. Those skilled in the art will recognize that other composite category sets may be provided for user selection in such an interface, as well as other individual application categories. A search string portion 74 is further provided in the search interface 70 for the user to enter in a search string to be matched.

While a user interface 70 is shown in FIG. 4 as one example of how categories may be associated with a search query, the present invention is not limited to such an embodiment. Accordingly, embodiments of the disclosed system may use other techniques for associating application categories with search queries, that may be transparent to a user, based on application configuration information, user settings, or any other appropriate technique for a given embodiment, implementation or deployment.

Figure 5:
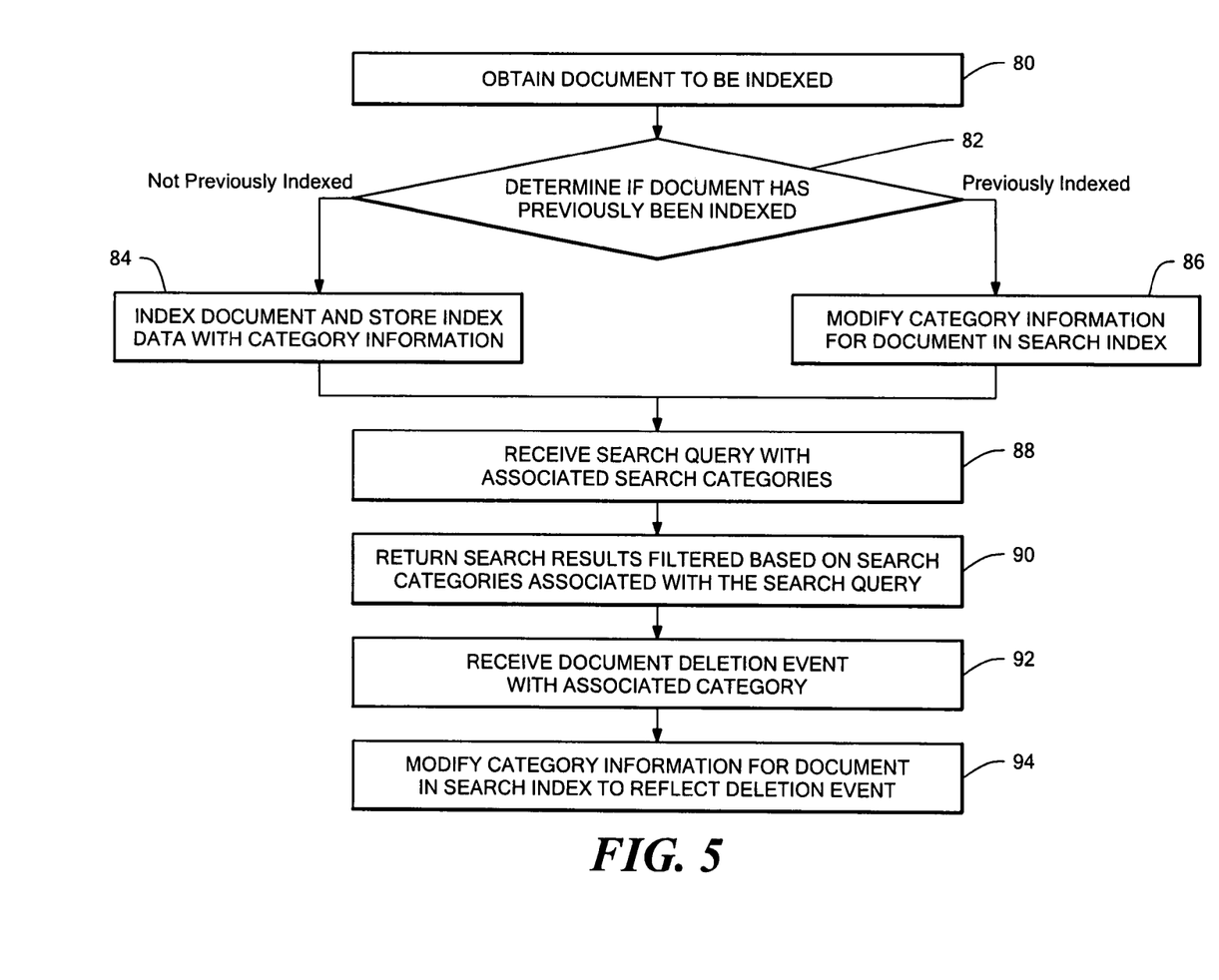
FIG. 5 is a flow chart showing steps performed by an embodiment of the disclosed system.

FIG. 5 is a flow chart showing steps performed by an embodiment of the disclosed system. At step 80, the disclosed system obtains a document to be indexed. A document may be passed to the indexing service of the disclosed system in various specific ways. For example, a document may be pushed to the indexing service by the application, or the indexing service could call up to an application to pull down any documents that have been changed. Other models for collecting the documents to be indexed may also be used.

At step 82, a determination is made as to whether the document obtained at step 80 has been previously indexed, and is therefore already represented in a shared full text search index. If so, the document need not be re-indexed, and step 82 is followed by step 86, in which application category information in the shared full text search index is modified as necessary. For example, if the document obtained at step 80 was obtained from a database associated with an email application, but the document had previously been indexed in association with a content management application, then at step 86 the application category information for the document in the shared search index would be modified to also associate the document with the email application.

Otherwise, if the document had not been previously indexed, at step 84 the index information for the document is stored in the shared search index in association with appropriate application category information. For example, if the document obtained at step 80 was located in a database associated with a content management application, then the application category information stored for the document in the shared search index would indicate the content management application.

At step 88, the disclosed system receives a search query and one or more search categories. The search categories received at step 88 may indicate one or more applications sharing the shared search index. The disclosed system operates to determine search results based on the search categories received at step 88, and returns search results filtered based on those search categories at step 90.

When a document is deleted by a an application, the disclosed system may receive indication of such an event at step 92. In an embodiment in which a single database is shared by multiple applications, the disclosed system may be used to determine whether a document can be deleted from the shared index in response to the application category information stored in association with the document. For example, if a document stored in a shared index is associated with multiple applications, category information in the shared search index will indicate each of those multiple applications. If one of the applications issues a delete operation detected at step 92 of FIG. 5, the disclosed system will delete the category information for the document indicating that application at step 94.

When all the applications sharing the document in the shared index have deleted the document, the disclosed system will determine that the document is associated with no application categories, and that the document can accordingly be deleted from the shared index. In this way, the disclosed system enables sharing of a single copy of a document across multiple applications, deletion of such a shared document when it is no longer needed by any application.

Thus there is disclosed a system that eliminates the need to re-index documents in many situations where a document is processed or stored by multiple applications. Application categories are used to enable applications to share a single search index by providing a filter on search results. As in the above example of moving an document attachment from an email application container to a document library managed by a content management application, the attached document may initially be associated with the email application through a registered category in a shared, full text index. When a user detaches the document into the document library, the document exists in both the document library and the email application container, and this is reflected in the shared index through an update to the associated application categories. The document may subsequently logically exist in only the document library through deletion of the containing email message. This deletion action results in another update to the shared index category information, removing the email category.

Another example of operation of an embodiment of the disclosed system occurs when the above described attachment document is modified after it has been stored in the document library, and prior to its deletion by the email application. Such an action represents an example of a change to the content of the document, and results in a separation of the entries for the new version of the document from the old version in the shared index. Such an operation requires indexing of the new document version for representation of its contents in the shared index.

As described above, when a previously indexed document is received for indexing, the disclosed system does not re-index the document's contents. The detection of a previously indexed document may, for example, be accomplished at step 82 of FIG. 5 by participating in a platform wide, unified transformation process allowing documents to be transitioned between any two application formats. Alternatively, such detection may be accomplished at a logical level below a format transformation process, by storing a unique hash of each document in the shared index, enabling identification identical content prior to adding a document to the index. Either technique would result in a platform level optimization that would be utilized by all applications utilizing the disclosed platform indexing service.

FIGS. 1-3 and 5 are block diagram and flowchart illustrations of methods, apparatus(s) and computer program products according to an embodiment of the invention. It will be understood that each block of FIGS. 1-3 and 5, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A computer-implemented method for providing a shared search index comprising:

obtaining at least one document from a first one of a plurality of software applications sharing a search index;

determining whether said document is a duplicate of a previously indexed document currently represented in said search index, wherein said previously indexed document was obtained from a second one of said plurality of software applications sharing said search index;

responsive to determining that said document is not a duplicate of said previously indexed document currently represented in said search index, indexing said document such that said document is represented in said search index; and responsive to determining that said document is a duplicate of said previously indexed document currently represented in said search index, modifying an existing document representation for said previously indexed document in said search index, wherein said existing document representation for said previously indexed document includes is a first category identifier indicating said second one of said plurality of software applications sharing said search index, wherein said modifying includes adding a second category identifier to said existing document representation in said search index, wherein said second category identifier indicates said first one of said plurality of software applications sharing said search index;

obtaining a search query;

determining at least one category associated with said search query;

determining, responsive to said search index, at least one document matching at least one token contained in said search query and associated with a category identifier matching said at least one category associated with said search query;

providing search results indicating said document matching said at least one token contained in said search query and associated with said category identifier matching said at least one category associated with said search query; and determining, responsive to said search index, at least one document matching at least one token contained in said search query and not associated with said category identifier matching said at least one category associated with said search query; and wherein said search results do not indicate said document matching said at least one token contained in said search query and not associated with said category identifier matching said at least one category associated with said search query.

2. The method of claim 1, further comprising:

determining that said search query is obtained from said first one of said plurality of software applications sharing said search index; and wherein said determining said at least one category associated with said search query generates a category associated with said search query indicating said first one of said plurality of software applications responsive to said determining that said search query was obtained from said first one of said plurality of software applications sharing said search index.

3. The method of claim 1, further comprising:

responsive to determining that said document is not currently represented in said search index, generating a unique document identifier for said document and storing said unique document identifier in association with said existing document representation in said search index; and wherein determining whether a subsequently obtained document is currently represented in said search index includes comparison of a unique document identifier associated with said subsequently obtained document with said unique document identifier stored in association with said existing document representation in said search index.

4. The method of claim 1, further comprising:

wherein said at least one category associated with said search query includes a plurality of categories; and wherein said at least one document matching at least one token contained in said search query is associated with at least a plurality of category identifiers matching said plurality of categories associated with said search query.

5. A system comprising:

a computer readable memory having program code stored thereon for providing a shared search index, said program code when executed performing steps comprising:

obtaining at least one document from a first one of a plurality of software applications sharing a search index;

determining whether said document is a duplicate of a previously indexed document currently represented in said search index, wherein said previously indexed document was obtained from a second one of said plurality of software applications sharing said search index;

responsive to determining that said document is not a duplicate of said previously indexed document currently represented in said search index, indexing said document such that said document is represented in said search index; and responsive to determining that said document is a duplicate of said previously indexed document currently represented in said search index, modifying an existing document representation for said previously indexed document in said search index, wherein said existing document representation for said previously indexed document includes a first category identifier indicating said second one of said plurality of software applications sharing said search index, wherein said modifying includes adding a second category identifier to said existing document representation in said search index, wherein said second category identifier indicates said first one of said plurality of software applications sharing said search index;

obtaining a search query;

determining at least one category associated with said search query;

determining, responsive to said search index, at least one document matching at least one token contained in said search query and associated with a category identifier matching said at least one category associated with said search query;

providing search results indicating said document matching said at least one token contained in said search query and associated with said category identifier matching said at least one category associated with said search query; and determining, responsive to said search index, at least one document matching at least one token contained in said search query and not associated with said category identifier matching said at least one category associated with said search query, and wherein said search results do not indicate said document matching said at least one token contained in said search query and not associated with said category identifier matching said at least one category associated with said search query.

6. The system of claim 5, said program code when executed further performing steps comprising:

determining that said search query is obtained from said first one of said plurality of software applications sharing said search index; and wherein said determining said at least one category associated with said search query generates a category associated with said search query indicating said first one of said plurality of software applications responsive to said determining that said search query was obtained from said first one of said plurality of software applications sharing said search index.

7. The system of claim 5, said program code when executed further performing steps comprising:

responsive to determining that said document is not currently represented in said search index, generating a unique document identifier for said document and storing said unique document identifier in association with said existing document representation in said search index; and wherein determining whether a subsequently obtained document is currently represented in said search index includes comparison of a unique document identifier associated with said subsequently obtained document with said unique document identifier stored in association with said existing document representation in said search index.

8. The system of claim 5, further comprising:

wherein said at least one category associated with said search query includes a plurality of categories; and wherein said at least one document matching at least one token contained in said search query is associated with at least a plurality of category identifiers matching said plurality of categories associated with said search query.

9. A computer program product comprising:

a computer readable storage media having program code stored thereon for providing a shared search index, said program code comprising:

program code for obtaining at least one document from a first one of a plurality of software applications sharing a search index;

program code for determining whether said document is a duplicate of a previously indexed document currently represented in said search index, wherein said previously indexed document was obtained from a second one of said plurality of software applications sharing said search index;

program code for, responsive to determining that said document is not a duplicate of said previously indexed document currently represented in said search index, indexing said document such that said document is represented in said search index;

program code for, responsive to determining that said document is a duplicate of said previously indexed document currently represented in said search index, modifying an existing document representation for said previously indexed document in said search index, wherein said existing document representation for said previously indexed document includes a first category identifier indicating said second one of said plurality of software applications sharing said search index, wherein said modifying includes adding a second category identifier to said existing document representation in said search index, wherein said second category identifier indicates said first one of said plurality of software applications sharing said search index;

program code for obtaining a search query;

program code for determining at least one category associated with said search query;

program code for determining, responsive to said search index, at least one document matching at least one token contained in said search query and associated with a category identifier matching said at least one category associated with said search query;

program code for providing search results indicating said document matching said at least one token contained in said search query and associated with said category identifier matching said at least one category associated with said search query; and program code for determining, responsive to said search index, at least one document matching at least one token contained in said search query and not associated with said category identifier matching said at least one category associated with said search query, and wherein said search results do not indicate said document matching said at least one token contained in said search query and not associated with said category identifier matching said at least one category associated with said search query.

\* \* \* \* \*